W. HINCHLIFFE,
SCROLL-SAWING MACHINES.
No. 193,706. Patented July 31, 1877.
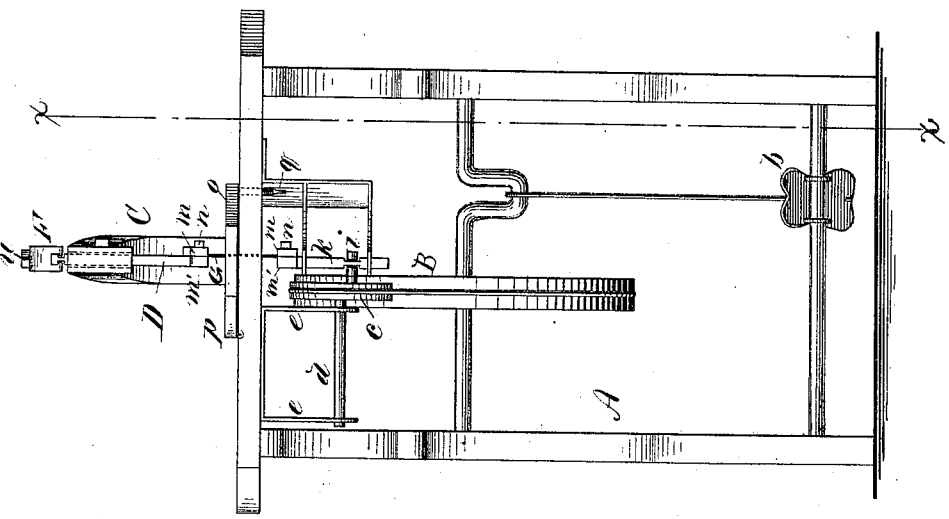
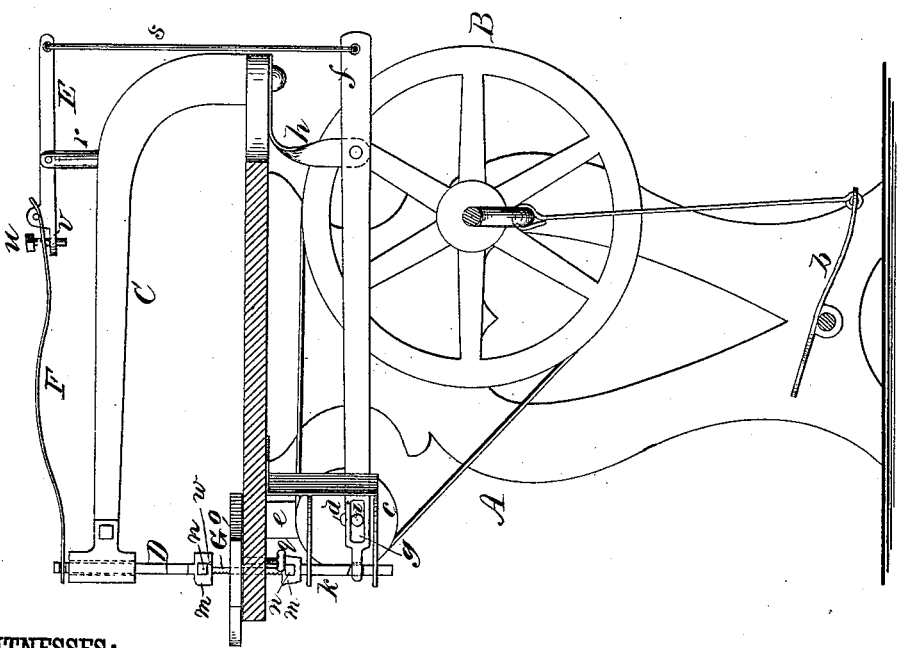
WITNESSES:
H. Rydquist
J. H. Scarborough
INVENTOR:
W. Hinchliffe.
BY Munn & Co
ATTORNEYS.

UNITED STATES PATENT OFFICE.

WILLIAM HINCHLIFFE, OF NASHVILLE, TENNESSEE.

IMPROVEMENT IN SCROLL-SAWING MACHINES.

Specification forming part of Letters Patent No. 193,706, dated July 31, 1877; application filed June 25, 1877.

*To all whom it may concern:*

Be it known that I, WILLIAM HINCHLIFFE, of Nashville, in the county of Davidson and State of Tennessee, have invented a new and Improved Scroll-Saw, of which the following is a specification:

Figure 1 is a side elevation, in section, on line $x\ x$ in Fig. 2. Fig. 2 is a front elevation.

Similar letters of reference indicate corresponding parts.

The object of my invention is to provide a simple easy-running scroll-saw, that maintains an even tension on the blade at every portion of the stroke.

In the drawing, A is a table, similar to an ordinary sewing-machine table, in which the shaft of the driving-wheel B is journaled, and in the lower part of which is pivoted the treadle $b$, which is connected, by a pitman, with the crank formed in the shaft of the wheel B.

The wheel $c$, which is driven by a belt from the wheel B, is placed on a shaft, $d$, that is journaled in hangers $e$, which are attached to the under side of the table-top.

A lever, $f$, having the slot $g$, is pivoted to a hanger, $h$, that projects downward from the table-top, and is engaged by a crank-pin, $i$, that projects from the face of the wheel $c$. The end of the lever $f$ is forked and fitted to notches in a bar, $k$, that moves in guides attached to the table. A head, $m'$, is formed on the upper end of this bar, to which a clamping-piece, $m$, is secured by the screw $n$.

The saw-table $o$ is hinged to the table A at $p$, and is pitched or inclined by turning the screw $q$. An arm, C, is attached to the table A, and extends over the table-top, and is provided with a guide for the bar D, which has upon its lower end a head and clamping-piece similar to that on the bar $k$.

A lever, E, is pivoted in a standard, $r$, that projects upward from the arm C, and the said lever is connected with the lever $f$ by a rod, $s$.

A spring, F, is connected with the lever E by having one of its ends slotted and placed under the pin that passes through an ear formed on the lever, and a screw, $u$, passes through the spring into the lever E, and is provided with a pin, $v$, by means of which the spring is raised when the screw is turned. The outer end of the spring is slotted and fitted to notches in the sides of the bar D.

The saw-blade G is clamped to the bars D $k$ by means of the clamping-screws $n$, and the position of the saw in the clamping device is determined by a pin, $w$, that projects from the side of each head.

The machine is operated by working the treadle, and more or less tension is given the saw by turning the screw $u$, and by turning the screw $q$ the table $o$ may be pitched or inclined.

The arrangement of the spring F is such that the tension on the saw is always the same in all parts of the stroke.

Having thus described my invention, I claim as new and desire to secure by Letters Patent—

The combination, with side-studded wheel $c$, operated by the treadle mechanism, and the bars D $k$, between which the saw is clamped, of the rod-connected levers E $f$ and spring F, arranged as shown and described, for the purpose specified.

WILLIAM HINCHLIFFE.

Witnesses:
 THOS. CALLENDER,
 J. L. PRICE.